United States Patent [19]

Fujii et al.

[11] Patent Number: 4,786,457
[45] Date of Patent: Nov. 22, 1988

[54] JIGGERING METHOD AND PROFILE TOOL FOR CERAMIC WARE PLASTIC CLAY

[75] Inventors: Shigemi Fujii, Handa; Eisuke Kumazaki, Nagoya; Kazutoshi Shigematsu, Tajimi, all of Japan

[73] Assignee: Noritake Co., Limited, Nagoya, Japan

[21] Appl. No.: 785,355

[22] Filed: Oct. 7, 1985

[30] Foreign Application Priority Data

Oct. 8, 1984 [JP] Japan ............................ 59-209771

[51] Int. Cl.$^4$ ............................................. B28B 1/02
[52] U.S. Cl. .................................. 264/310; 425/267; 425/459
[58] Field of Search ............... 425/267, 268, 459, 263, 425/265, 266, 378 R, 376 R, DIG. 120, 72 R, 95, 97; 264/312, 209.3, 209.4, 209.8, 177.17, 310, 311; 72/67, 69

[56] References Cited

U.S. PATENT DOCUMENTS

| | | | |
|---|---|---|---|
| 1,732,339 | 10/1929 | Osborne | 425/263 |
| 1,769,529 | 7/1930 | Miller | 425/267 X |
| 1,769,530 | 7/1930 | Miller | 425/268 X |
| 1,850,939 | 3/1932 | Miller | 425/268 X |
| 1,977,700 | 10/1934 | Sebring, Jr. et al. | 425/268 X |
| 2,114,254 | 4/1938 | Miller et al. | 425/268 X |
| 2,384,845 | 9/1945 | Miller | 425/267 X |
| 2,474,509 | 6/1949 | Allen | 425/268 X |
| 2,480,062 | 8/1949 | Wahl et al. | 425/267 X |
| 2,485,159 | 10/1949 | McLarkey | 425/267 |
| 2,579,815 | 12/1951 | Gialanella | 425/97 |
| 2,856,667 | 10/1958 | Gorsuch | 425/95 |
| 3,069,727 | 12/1962 | Shramek | 425/97 X |
| 3,265,778 | 8/1966 | Griffith | 425/97 X |
| 3,386,140 | 6/1968 | Bruckner | 425/3 |
| 3,387,347 | 6/1968 | John | 425/151 |
| 4,485,062 | 11/1984 | Dawes et al. | 425/97 X |

FOREIGN PATENT DOCUMENTS

| | | |
|---|---|---|
| 125511 | 11/1984 | European Pat. Off. . |
| 1364675 | 5/1964 | France . |
| 44-7102 | 3/1969 | Japan . |
| 50-11922 | 5/1975 | Japan . |
| 55-6281 | 4/1980 | Japan . |
| 55-53374 | 12/1980 | Japan . |
| 56-75812 | 6/1981 | Japan . |
| 58-5980 | 4/1983 | Japan . |
| 1246615 | 9/1971 | United Kingdom ............... 425/263 |
| 1246613 | 9/1971 | United Kingdom . |
| 1268521 | 3/1972 | United Kingdom . |
| 1296367 | 11/1972 | United Kingdom ............... 425/268 |

OTHER PUBLICATIONS

Kenneth D. Sutton, *Ceramics Industry Magazine*, Mar. 1979, pp. 24–26.

Rexsford Newcomb, Jr., *Ceramic Whitewares*, pp. ix–x, 91–95 (1947).

W. D. Kingery, *Introduction to Ceramics*, pp. xi–xiii, 49–51.

Edward P. McNamara, *Ceramics*, vol. III, pp. v, 15–20, (1948).

*Primary Examiner*—Richard L. Chiesa
*Attorney, Agent, or Firm*—Ciotti & Murashige, Irell & Manella

[57] ABSTRACT

Jiggering for ceramic ware is effected while providing a jiggering surface of a jiggering profile tool with a gas to produce a thin gas film between the jiggering surface and plastic clay. The gas film is formed by a gas fed through or from the outside of the jiggering surface. High-temperature heating of the tool is dispensed with.

12 Claims, 4 Drawing Sheets

JIGGERING METHOD AND PROFILE TOOL FOR CERAMIC WARE PLASTIC CLAY

FIELD OF THE INVENTION

The present invention relates to a jiggering method for ceramic ware plastic clay, particularly a jiggering method and apparatus of the rotary jiggering profile tool type as well as a profile tool to be used therefor.

BACKGROUND OF THE INVENTION

In most cases, the jiggering method of the rotary profile tool type uses as the tool material a metal material, which is heated to produce a steam film between the tool and the plastic clay to be subjected to contact-rolling (referred to as jiggering), thereby preventing that plastic clay from sticking to the tool, while keeping smooth contact therebetween. (This method shall hereinafter be referred to as the heated tool method; see Japanese Patent Kokoku-Publication No. 30-6281 in this regard.) In other words, the prior art rotary profile tool type jiggering method, as referred to just above, involves heating (to about 100° C.) a jiggering profile tool (roller) formed of an iron or aluminum material by cutting by means of a gas burner, an electric heater or the like to subject plastic clay to jiggering, while a steam film is produced between the tool and the plastic clay.

SUMMARY OF THE DISCLOSURE

Suitably, the surface temperature of the profile tool material is usually in a range of 95° to 105° C. Plastic clay sticks to the rolling (jiggering) surface of the tool at a temperature of lower than this range, whereas the resulting shaped produce cracks on the rolling surface at a temperature exceeding the upper limit. For that reason, the aforesaid temperatures should constantly be maintained. However, there are some disadvantages in that to constantly keep a certain temperature requires considerable skill, working environment becomes worse due to heat dissipation, etc. In addition, to keep the tool in the heated state causes the conduction of heat to associated parts (e.g., a lever or rod), to which the tool is attached. As a result of those parts being heated due to such heat conduction, they suffer thermal expansion, so that the relative position between the tool and the mold varies, and an error takes place with respect to the rotary shafts therebetween. In consequence, there is an unavoidable change in the thickness of the resultant shaped product, which raises problems such as deteriorations in the shape accuracy thereof. Unless plastic clay (i.e., green ceramic material having plastic deformability) contains a certain proportion of clay (at least about 20% by weight), there are also cracking, sticking or other problems, resulting in unstable jiggering work. Thus, the heated tool method is hardly said to be generally employable.

The present invention has for its primary object to obviate the disadvantages of the prior art.

The jiggering method according to one aspect of the present invention is characterized in that jiggering is carried out, while providing a thin gas film between plastic clay and the jiggering surface of a jiggering profile tool by supplying said surface with a gas.

The jiggering profile tool for jiggering according to another aspect of the present invention comprises a tool body having a jiggering surface, which is formed of a gas permeable material, or has therein at least one gas permeating bore, and a gas supply means for ejecting a gas out of that jiggering surface.

The jiggering apparatus for ceramic ware plastic clay according to a third aspect of the present invention comprises a jiggering profile tool and a gas supply means for ejecting a gas from the outside of the jiggering surface of said tool into a space between said tool surface and said plastic clay.

The gas may be ejected through the jiggering surface. Alternatively, the gas may be ejected (or blown) onto the jiggering surface from the outside thereof. Still alternatively, the combination of said two ejecting methods may be employed, in some cases.

In accordance with the present invention, it is not generally required that the tool be heated to high temperatures (in the prior art, the tool had to be heated at about 100° C.). The present invention provides shaped products of sufficiently high quality only through the formation of a gas film achieved by gas feeding (ejecting or blowing). However, it is preferred that the tool be heated at a lower temperature (50°-60° C.) in the event that gas blowing is effected from the outside of the tool surface. In other instances, low-temperature heating of the profile tool does not necessarily give rise to any objection.

The aperture of the gas permeating bore(s) (corresponding to the pores in the case of a porous material) of the profiled tool may be selected, depending upon the desired quality of shaped products, and the gas pressured is regulated depending upon the aperture.

It is possible to stepwise or gradually decrease the pressure of the gas to be ejected with the progress of jiggering. This is particularly useful in the case that the aperture of the bore is relatively large (about 0.5 mm or larger). Where the aperture of the bore is relatively small (about 0.5 mm or less), it will suffice to keep the pressure of the ejecting gas constant during jiggering. However, the regulation of ejecting pressure is preferable in view of the prevention of trace on the jiggered product due to an ejecting nozzle.

the gas may be ejected out of the jiggering surface through the pores in the jiggering profile tool formed of a gas permeable material, or may alternatively be ejected from at least one gas permeating bore provided in the jiggering surface of the jiggering profile tool formed of a nongaspermeable or dense material.

Gas blowing from the outside of the jiggering surface may be achieved through a nozzle disposed in the vicinity thereof.

The gas permeating bore(s) opened in the jiggering surface is (are) preferably of a diameter of 0.1-2 mm. The pores in the gas permeable tool material are preferably 1- about 100 μm in diameter.

The jiggering profile tool according to the present invention is preferably of the rotary type, but the rotary type profile tool may be used as the stationary state. Usually, the rotary axis of the tool intersects that of an associated mold at a predetermined angle. An amount of plastic clay is placed and jiggered (rolled) between the tool and the mold (fixed onto the upper portion of a jigger), which rotate with each other.

In the rotary type jiggering method for ceramic ware according to the present invention, a gas (e.g., compressed air, etc.) is fed to the jiggering surface to be in contact with plastic clay to produce thereon a thin gas film, thereby preventing plastic clay from sticking to the tool. This provides an effect in preventing plastic clay from sticking to the tool like in the case as if the conventional heated jiggering profile tool be used to generate a steam film from plastic clay.

The present invention eliminates the limitations imposed by the prior art method, and provides a jiggering method which makes jiggering (particularly rotary type) possible with a small number of attachments or accessories, can be used in wider ranges, and renders possible universal jiggering without recourse to any particular skill.

DETAILED DESCRIPTION OF THE PREFERRED EMBODIMENTS

Figure 1:
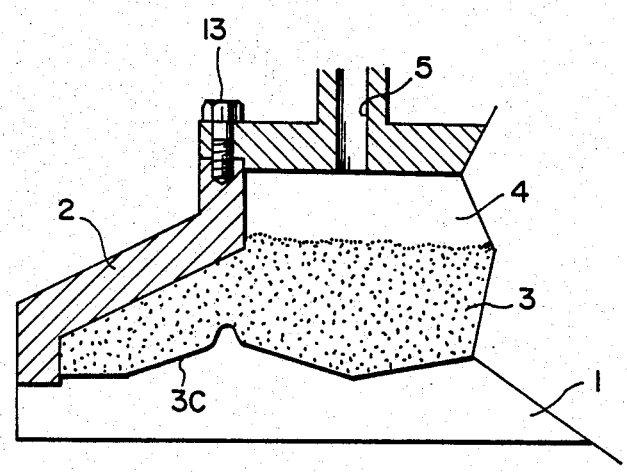
FIG. 1 is a sectional view showing one embodiment of the present invention.

The present invention will be explained. In the present disclosure, the term "ceramic ware" is understood in a broad sense. Thus, the present invention is generally applicable to the jiggering of ceramic green shaped bodies including whiteware.

Referring first to the use of a jiggering profile tool formed of a gas permeable material, it is fabricated from a porous or gas-permeable material such as gas permeable gypsum, metals (sintered plastics, metals), ceramics, etc. in such a manner that it gives a predetermined amount of gas permeation. Usually, the amount of gas permeation to be assured is at least 20 cc/cm$^2$ min (per unit area of jiggering surface of the tool), preferably at least 30 cc/cm$^2$ min.

Referring to the forcively rotating rotary jiggering (roller) method, modification of an ordinary rotary jigger machine is made to the rotary shaft, to which the profile tool is attached, so that, during jiggering, e.g., an amount of compressed air may be supplied toward the gas permeable profile tool and rolling surface. The gas permeable profile tool is then mounted in place. Next, jiggering is effected, while an amount of compressed air is fed to the profile tool, and rotation is given thereto by a separate tool-driving device during a jigger with a mold is rotating. In this case, an amount of air ejected from the surface of the tool provides a gas film between it and plastic clay to be subjected to jiggering (rolling), whereby the surface of the clay is smoothened without fear of the clay sticking to the tool.

As the material for gas permeable tools, use may be made of alpha-gypsum which is provided therethrough with a continuous pore(s) by air blowing, and is subsequently cured. Alternatively, use may be made of materials having a certain strength and a given gas permeability, such as porous sintered ceramic materials, gas permeable plastics and composite materials of aggregates and plastics (shaped materials of inorganic aggregates with epoxy of phenol base resins serving as a binder), sintered metals (based on stainless steel, or copper base), etc. Those materials may be used in the composite or laminated form. (As the lining material, use may be made of other porous material or metals having a gas permeating pores or bores). the sintered metals have preferably a grain size of no larger than about 10 microns, said grain size being determined depending upon the required surface smoothness of shaped products.

Referring to gypsum, its reinforcement and mounting are achieved by a holder. If required, it may be provided therein with a rib for assuring bonding to the holder. From an air inlet formed in the rotary shaft, a gas is dispensed onto the gas permeable tool through an air chamber, etc., and is ejected from the jiggering surface thereof. The air chamber has its shape suitably selected depending upon the size, material and shape of the tool, and may be branched.

To obtain sufficient results, pressurized air (preferably dry air) may be used as the gas to be supplied, but the present invention is not limited thereto. In carrying out jiggering according to the present invention, rolling effect is obtained by allowing the profile tool to rotate in the same direction as the jigger (mold) and with a difference in the peripheral speeds therebetween. Depending upon the conditions of plastic clay, etc., the jiggering profile tool used may rotate independently of the jigger (i.e., the mold) or following the jigger (without separate driving), or alternatively be stationary. Thus, the profile tool of the present invention is characterized in that it can be used in various versions and wide ranges. Hence, the present invention is applicable to the jiggering of a variety of ceramic materials.

Such holders as mentioned above may be necessarily be used for tool materials having a sufficient strength, such as sintered metals, etc. In this case, they may be fixed directly to the rotary shaft (usually onto its end flange). However, the periphery and the surface opposite to the jiggering surface of this profile tool must be coated with a suitable nonpermeable material (impregnated with resin, etc.) or have to close up the pores of the sintered material.

The jiggering profile tool according to another embodiment of the second aspect of the present invention is formed of a nongas-permeable or dense mold material (metals, synthetic resin, synthetic rubber, ceramics), and has at least one gas permeating bore opened in its jiggering surface. The gas permeating bore(s) has (have) an aperture of 0.1 to 2 mm or more. That aperture is generally broken down into two ranges, (i) 0.1 to 0.5 mm (inclusive) and (ii) more than 0.5 mm.

Referring to the range (ii), it is possible to stepwise or gradually reduce the pressure (or ejecting speed) of the gas (usually dry air) ejected as the jiggering proceeds. This is required to obtain shaped products of good quality.

APERTURE RANGE (i)

Figure 3:
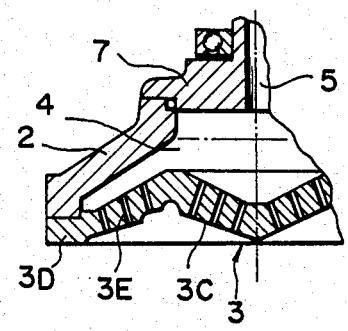
FIG. 3 is a partly sectioned view of a further embodiment.

Referring to FIG. 3 a jiggering profile tool (roller) formed of a dense material 3D is provided through a jiggering surface 3C with at least one gas permeating through bore 3E of 0.1 to 0.5 mm in diameter. (Provision of only one gas permeating bore is made in the central portion of the jiggering surface, provision of only two bores is made in the foot portion of table ware product, and provision of at least several bores is made for other cases.) The jiggering surface 3C is provided, on the opposite (rear) side thereto, with a chamber 4, into which a dry gas can be fed in a pressure range of 0.5 to 5 kgf/cm$^2$. The profile tool is attached to a rotary type jiggering apparatus. For instance, dry air is ejected from the through bores in a rate of about 1 Nlit./min for an 8-inch dish and in a rate of 0.7 Nlit./min for a 6-inch dish. In the present embodiment the jiggering can be made at room temperature. In this manner, the heating of the jiggering profile tool which required a temperature of 90° to 110° C. in the prior art may be elminated. In the present invention, it is also possible to apply low-temperature heating (approximately 50°–60° C. or less) wherein the jiggering speed may be somewhat enhanced.

Figure 4:
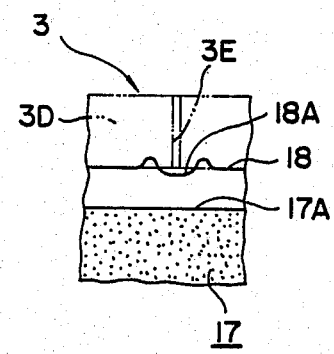
FIG. 4 is a schematical view showing a bore trace defect around the gas permeating bore.

With the jiggering profile tool made of special plastic material containing lubricating material such as nylon plastic containing molybdenum compound, heating a profile tool was not necessary but a revolution difference of 50 to 100 r.p.m. was also required between the tool and the associated jigger (mold). In contrast thereto, with the profile tool of the present embodiment, however, jiggering can be carried out without forcibly rotating it. In other words, the tool of the present invention may be rotated free of positive (separate) driving, i.e., rotating freely following the associated jigger (mold) for jiggering. Continuous ejecting of the gas can prevent the bores from clogging which may otherwise be caused by plastic clay under rolling pressure exerted during the jiggering of plastic clay. An aperture range is suitably between 0.1 mm and 0.5 mm. With an aperture exceeding 0.5 mm continuous ejection of gas is not preferred, since, as shown in FIG. 4, a trace of 18A of a crater-like shape in section occurs in the shaped surface 18 of products. The through bore may not always be of a round shape but ellipse in aperture shape. A beautiful surface is obtained, unless the longest diameter (this shall hereinafter be referred to as "bore size") of the bore exceeds 0.5 mm. It is noted that the present invention is applicable to all the tools for the jiggering of not only dishes but also cups, bowls, etc.

APERTURE RANGE (ii)

The upper limit of the bore size is defined based on the size of product, surface precision requirement, properties of plastic clay material and the like, which, as regards high quality tableware, is usually suitable at about 2 mm or less.

A jiggering profile tool (roller) is provided in the jiggering surface with at least one, preferably one to several, gas permeating bore having a diameter of exceeding 0.5 mm. Preferably, that bore(s) is (are) formed on the foot-of-the bottom portion or the inside of the foot-of-the bottom in the case of tableware. A dry gas is designed to be ejected through a chamber defined on the rear side of the jiggering surface. The profile tool is mounted in place on a jiggering apparatus. Jiggering is effected at room temperature, while ejecting a gas from the through bore in the tool, at a relatively high pressure of no lower than 1 kgf/cm², preferably 1 to 3 kgf/cm² at the first half period of jiggering (during which period plastic clay covers all over the forming surface of the mold and is vigorously being discharged) and, at a relatively low pressure of no higher than 1 kgf/cm², preferably 0.1 to 1 kgf/cm² at the second half period of jiggering (during which period descending of the tool is ceased and a slightly excessive amount of plastic clay is being discharged). It is presumed that the plastic clay is freed from a roll-deforming state (due to the decrease of the interdistance between the tool and mold caused by the descending of the tool) to a substantially atmospheric pressure state at the time of jiggering being completed. The conditions to meet room-temperature jiggering are, e.g., 2 kgf/cm² at the first half period and 0.5 kgf/cm² at the second half period in the case where two bores of 1 mm in diameter are symmetrically provided for a 10.5-inch dinner dish.

Figure 5:
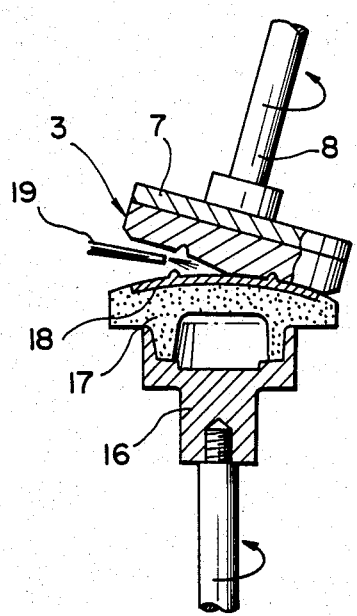
FIG. 5 is a sectional view of a still further embodiment of the present invention.
Figure 6:
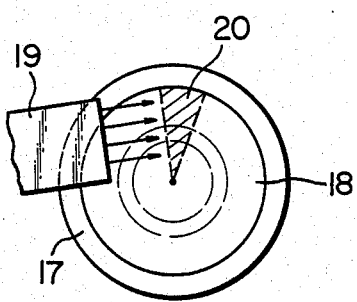
FIG. 6 is a schematic diagram showing the embodiment of FIG. 5 as viewed from the top by removing the profile tool 3.

With the conventional heated tool, it was usually impossible to prevent sticking of plastic clay to the jiggering surface, unless a specific formulation of plastic clay having a water content of 20 to 22% by weight is used. When using the tool of the present invention under the aforesaid conditions, however, it was possible to effect jiggering of plastic clay having a water content as high as 25% by weight without any hindrance. In addition, the surface of the portion of the plastic clay to be subjected to jiggering, corresponding to the gas permeating bore, gave a beautiful skin having no trace of that bore. In the case of the jiggering profile tool (roller) having therein a gas permeating bore, it is possible to remove an influence of bore traces upon plastic clay, if the size of that bore is no larger than 0.5 mm, but bore formation requires skill and costs relatively high. A bore of no larger than 0.5 mm requires relatively high-pressure ejecting so as to prevent its clogging; however, if high-pressure ejecting is continued, care should be taken, since a trace 18A (FIG. 4) just like a crater in the cross section occurs at the portion of shaped products corresponding to the bore. With a larger bore, this problem is avoided by a stepwise or gradual and controlled pressure reduction. Thus, this embodiment introduces considerable improvements into the conditions for using plastic clay by adding simple and inexpensive measures to the prior art jiggering profile tool. THIRD ASPECT Reference will next be made to one embodiment according to the third aspect of the present invention, referring to FIG. 5 and FIG. 6 wherein a gas is blown onto the profile tool from the outside thereof.

In the rotary type jiggering method, a metal material is usually used as the jiggering profile tool material, and is heated for jiggering. In the jiggering of plastic clay with that tool, a (preferably dry) gas is fed into a space therebetween from the outside, using a nozzle 19 (preferably in the slot or sector form). Preferably, gas blowing is effected along the direction of rotation of the jigger for profile tool). Namely, gas is preferably blown in a tangential direction of the rotating bodies along the rotating direction thereof towards the contact portion 20 (line) of the tool and the plastic clay so as to provide a gas film therebetween. In this case, practically good jiggering can be achieved by applying low-temperature heating of about 50° to about 60° C. to the tool. Note that a heating temperature of 95° to 105° C. was practically required in the prior art. A gas blowing pressure that can control the direction of the gas flow well (about 0.1 to 0.5 kgf/cm²) is sufficient; higher gas blowing pressures on the order of as high as 1 kgf/cm² may be used but are not necessary. Experiments have taught that the rate of dry air supply is suitable at 35 l/min and 20 l/min for 8- and 6-inch dishes at a tool temperature of 60° C., respectively, as well as 35 l/min and 27 l/min for 8- and 6-inch dishes at 50° C. By decreasing the tool temperature by 40°–50° C., compared with the conventional one, it is possible to use a type of plastic clay having a water content that is higher than that of the type in the heated tool so far used in the prior art by about 1%. This helps to decrease the amount of load applied on the jiggering apparatus and on the clay extruder or mixer, too. As a matter of course, it is also possible to sue plastic clay having the same water content as that of plastic clay used with the conventional tool. It is further understood that the profile tool may be either of the inner type or of the outer type.

The foregoing embodiment has, the following characteristic features, correspondingly.

1. Since the temperature to which the tool is to be heated is low, it is possible to achieve some energy saving and improvements in the working environment.

2. Since jiggering can be effected with plastic clay having a higher water content, it is possible to increase the capability of the jiggering apparatus and clay extruder.

3. There is not possibility of any failure and cracking due to overheating of the tool.

Throughout the embodiments according to the present invention, no particular limitation is imposed upon the temperature of the gas (air) used. With a high-pressure gas, cooling takes place usually due to adiabatic expansion, and with low- or normal-pressure gas blowing, a gas temperature is maintained after blowing. By the heating or regulation of the gas temperature, the rate of jiggering can be controlled or increased.

In the following, the present invention will be explained in detail with reference to the examples.

Example 1

With the jiggering apparatus incorporated with the jiggering profile tool formed of a gas permeable material, jiggering was effected, while an amount of air was fed to produce an air film, not a steam film, between the tool and a clay blank (batt) which has been preliminarily shaped into a disk.

Fabrication of Tool: A gas permeable alpha-gypsum material was used.

As shown in FIG. 1, a tool material 3 (gas permeable alpha-gypsum) was cast into a holder 2 set on a case mold 1. Immediately following the start of hardening of gypsum, it was removed from the case mold. Then, an amount of air was fed into an air chamber 4 through an air inlet 5 for air blowing.

Air Supply Pressure: 3.5 kgf/cm$^2$
Air Blowing Time: about 60 minutes

This profile tool was used for the jiggering of various types of plastic clay having water contents of 21 to 26% by weight (incorporated with 5 to 50% by weight of clay for providing plasticity, as well as kaolin, quartz, feldspar and the like) to obtain therefrom dishes measuring 6 to 10.5 inches in diameter and 4 to 5 mm in the thickness of the major portions, as measured after firing sintering). The jigger and the profile tool were rotated at 320–360 r.p.m. and 300–340 r.p.m. in the same direction, respectively, and air was fed at a pressure of 1.5 kgf/cm$^2$. The resulting shaped products were more excellent in quality than those obtained with the conventional heated tool, and exhibited good quality after sintering.

Experiments have indicated that, if the rate of air passed is 15 l/min or higher for 8-inch dishes, the resulting surface is equal or superior to that obtained with the heated tool in smoothness. Referring to the pressure of air required to assure that air flow rate, a sufficient rate was obtained for the gas permeable gypsum tool, when it was 1.5 kgf/cm$^2$. It was also noted that with a gas permeable material of a high porosity (gas permeable plastics, metals, etc.), sufficient flow rate was obtained at 0.5 to 1 kgf/cm$^2$.

In this connection, similar jiggering was carried out with the tool and mold of the similar shapes by the conventional heated tool method (gas burner heating). However, any satisfactory jiggering could not be effected, unless a water content of 21±0.5% by weight was maintained.

Example 2

Figure 2:
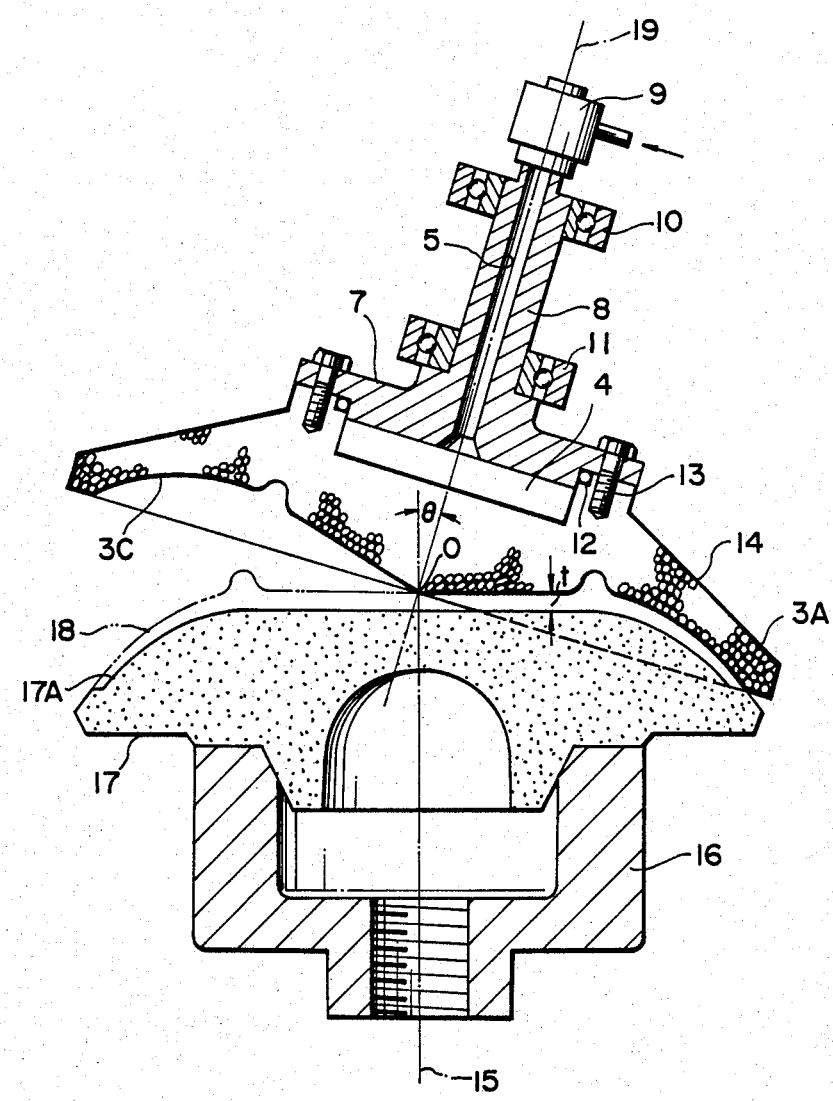
FIG. 2 is a sectional view showing another embodiment of the present invention.

Fabricated was a gas permeating jiggering profile tool 3A formed of sintered copper (having a mean grain size of 10 micron and a porosity of about 35%), which was provided therearound with a resin-impregnated layer 14, as illustrated in FIG. 2. Various types of jiggering were conduced at a pressure of 0.5 to 1 kgf/ccm$^2$ and under the conditions similar to those mentioned in Ex. 1. The resulting shaped products were all satisfactory, and the results of sintering thereof were also satisfactory.

FIG. 2 shows a main part of the jiggering apparatus used in this embodiment of the present invention in a state where the jiggering has been just completed. The rotary jiggering profile tool 3A includes a lower jiggering surface 3C directed to the bottom, and faces a molding surface 17A of a mold 17 (which is supported on a mold base 16 for rotation around the axis of rotation 15) at a given gap t (equal to the thickness of a shaped product). That tool is then fixed to a flange 7 disposed at the lower end of rotary shaft 8 by bolts 13 through an O-ring 12. The center axis 19 of the shaft 8 intersects the axis of rotation 15 of the jiggered mold at an angle of θ with the intersection O being in substantial coincidence with the center of the jiggering surface 3C.

An air supply inlet 5 extends through the center of the rotary shaft 8, and communicates with a compressed air source via a rotary joint 9. An air chamber 4 is opened at the lower end of the inlet 5 for the distribution of air over the entire tool. The rotary shaft 8 is supported by a (vertically movable) supporting member, not shown, through bearings 10 and 11. A clay blank or batt undergoes a rolling and jiggering action produced by the relative rotation of the mold 17 and the tool 3A with the given gap t, thus giving a shaped product 18 having a uniform density and a smooth surface.

The effects obtained in carrying out the present invention are set forth below.

Embodiments without heating:

1. Tool-temperature regulation requiring skill, that is needed in the conventional heated metal tool, can be dispensed with. Good results are obtained merely by supplying the tool with a certain gas (esp., air).

2. Dispensing with heating of the tool contributes to energy savings and improvements in working environments.

3. Since it is possible to avoid sticking and adhesion of plastic clay to the tool, which may occur with respect to the heated tool, plastic clay softer than that used with the heated tool can be employed resulting in a reduction in the load applied to the jiggering apparatus.

4. Reduction in the weight of the tool leads to simple handling.

5. Any defective products due to underheating or overheating are not produced.

6. Jiggering can be effected with plastic clay having a wider range of water contents and further reduced amounts of clay (as the plastisizer).

Embodiment with low temperature heating:

Regarding the items 1, 2 and 5, the drawbacks of the prior art due to heating the tool to a high temperature are substantially eliminated.

What is claimed is:

1. A jiggering method for ceramic ware plastic clay comprising:
   (a) providing a charge of said plastic clay on a jigger;
   (b) providing a jiggering profile tool disposed relative to said jigger and plastic clay such that during the jiggering operation, the jiggering surface of said profile tool is in contact with less than the entire surface area of said plastic clay charge and said surface of the profile tool is formed of a gas permeable material; and
   (c) jiggering said plastic clay charge into ceramic ware by contacting said surface of the profile tool to said plastic clay charge while rotating said profile tool and said plastic clay charge and providing a thin gas film between said plastic clay and said jiggering surface of the profile tool by supplying said jiggering surface of the profile tool with a gas by ejecting the gas through pores in said gas permeable material thereby preventing said plastic clay from sticking to said profile tool.

2. A method as defined in claim 1, in which the pressure of the gas ejected is stepwise or gradually decreased with the progress of jiggering.

3. A method as defined in claim 1, in which the pressure of the gas to be ejected is kept constant during jiggering.

4. A method as defined in claim 1, in which jiggering is effected with said jiggering profile tool which is rotatable independently of the rotation of said jigger.

5. A method as defined in claim 1, wherein the jiggering is effected with said jiggering profile tool which is rotatable following the rotation of said jigger.

6. A method as defined in claim 1, in which the jiggering is effected with said jiggering profile tool which is secured in a stationary position during the jiggering operation.

7. A jiggering method as defined in claim 1, wherein the gas is ejected at a flow rate of at least about 20 cc/cm$^2$.min. with respect to the jiggering surface.

8. A jiggering apparatus for ceramic ware plastic clay comprising a jigger for holding a charge of said plastic clay to be jiggered, a jiggering profile tool having a jiggering surface which contacts less than the entire surface of said plastic clay charge to be jiggered during the jiggering operation, comprising a rotatable tool body, which includes a jiggering surface comprised of a gas permeable material, and a gas supply means for ejecting a gas from said jiggering surface through pores in said gas permeable material of said jiggering surface during the jiggering operation thereby providing a thin gas film to prevent the plastic clay from sticking to said jiggering surface during the jiggering operation.

9. A jiggering profile tool as defined in claim 8, which further comprises pressure regulating means for regulating the ejecting gas pressure during the jiggering operation.

10. A jiggering profile tool as defined in claim 8, wherein the pores are of a diameter in the range of from about 1 μm to about 100 μm.

11. A jiggering profile tool as defined in claim 8, wherein the gas permeable material of the tool body comprises gas permeable gypsum.

12. A jiggering profile tool as defined in claim 8, wherein the gas permeable material of the tool body comprises a sintered metal.

* * * * *